Dec. 8, 1942.     R. C. SKEEL     2,304,126
STRUCTURAL JOINT
Filed Aug. 8, 1941
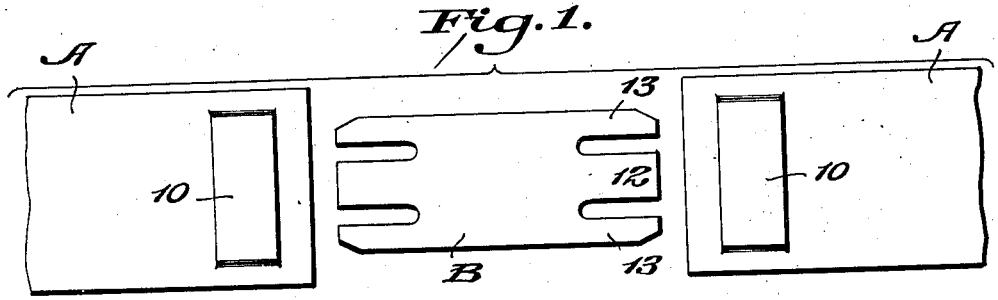
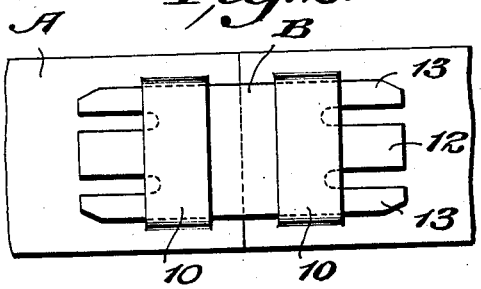
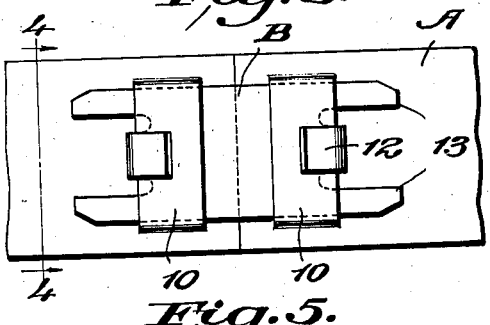
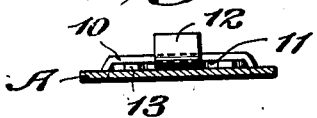
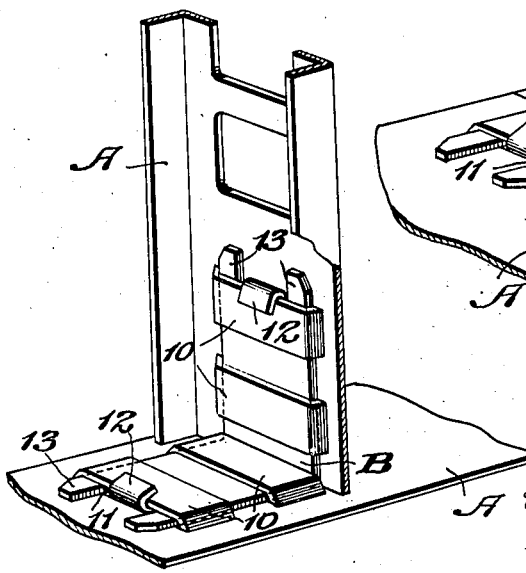
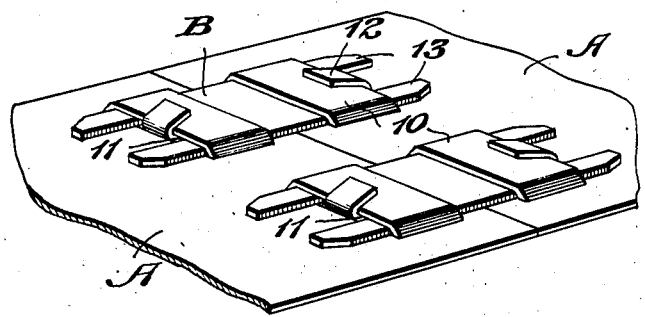
Inventor
R. C. Skeel,
By Wolhaupter & Groff
Attorneys Patented Dec. 8, 1942

2,304,126

UNITED STATES PATENT OFFICE 2,304,126

STRUCTURAL JOINT

Ray C. Skeel, Poland, Ohio, assignor to Truscon Steel Company, Youngstown, Ohio, a corporation of Michigan Application August 8, 1941, Serial No. 406,046

11 Claims. (Cl. 189—36)

This invention relates to structural joints, capable of use for connecting together various different members, but particularly adapted and intended for use in connecting together sheet metal members such, for example, as are used in the construction of metal shelving, metal partitions, metal frames and the like, and has for its general object to provide a joint which is extremely simple, very inexpensive, and which yet is highly efficient for its purpose.

According to the invention, the members to be joined together are formed to be connected by a simple key element in a manner involving a minimum of exceedingly simple operations which require no special skill and which may be accomplished very rapidly, and in this connection another object of the invention is to provide a joint according to which the members to be connected together may readily be fabricated in the shop and the key element may be produced as a simple, inexpensive sheet metal stamping.

With the foregoing and other objects in view, which will become more fully apparent as the nature of the invention is better understood, the same consists in a structural joint embodying the novel features of construction, combination and arrangement of parts as will be hereinafter more fully described, illustrated in the accompanying drawing and defined in the appended claims.

In the accompanying drawing, wherein like characters of reference denote corresponding parts in related views:

Fig. 1 is a plan view of the elements of the invention, according to one particular form thereof, shown in separated relationship.

Fig. 2 is a plan view of the elements of the invention shown in assembled relationship but not locked together.

Fig. 3 is a plan view of the elements of the invention shown in assembled relationship and locked together.

Fig. 4 is a cross section on the line 4—4 of Fig. 3.

Fig. 5 is a side elevation of the elements in the relationship shown in Fig. 3.

Fig. 6 is a perspective view illustrating use of a plurality of joints as shown in Figs. 1 to 5 for connecting together a pair of members; and Fig. 7 is a perspective view illustrating an alternative embodiment of the invention.

Referring to the drawing in detail, A, A designate, according to each illustrated form of the invention, a pair of sheet metal members to be connected together, and B designates generally a sheet metal key element for connecting said members together.

The members A, A may be of various different sizes, shapes and forms and may be disposed in various different relationships to each other. For example, Figs. 1 to 6 illustrate said members as being in the form of sheet metal base pieces such as are commonly employed in the construction of sheet metal partitions, shelving and the like, and further illustrate said members as being disposed in a common plane in end to end relationship, while Fig. 7 illustrates one of said members as being in the form of a sheet metal base piece and the other of said members as being in the form of sheet metal stud of channel shape in cross section resting at its lower end upon said base piece and rising vertically therefrom.

In accordance with the invention, each member A, A, whatever may be its form and purpose, is provided with a strap 10 which is joined thereto at its ends and is offset therefrom between its ends, thereby providing a slot 11 to accommodate a related end portion of the key element B.

The straps 10 may be, and preferably are, comprised by portions of the members A, A pressed from said members, but they may, alternatively, be comprised by elements separate from said members and fastened thereto in any suitable manner, as by welding, riveting or the like. Thus, while it is desirable that the members A, A be of sheet metal form in order that the straps 10 may be pressed therefrom, it is apparent that since said straps may be separate from and suitably fastened to said members, the latter are not necessarily of sheet metal form but may be composed of materials other than sheet metal.

The straps 10 are of suitable widths to afford desired strength and they may be of any desired lengths and may be offset from the members A, A any desired amounts to provide slots 11 of desired lengths and depths. Preferably, however, they are of such lengths, and are offset from the members A, A such amounts, that the slots 11 formed thereby correspond in length and depth to the width and thickness, respectively, of the end portions of the key element B to be inserted therein. Accordingly, when the end portions of the key element B are inserted into said slots they fit closely therein and therefore are practically immovable, except lengthwise, relative to the members A, A.

If the members A, A are in the form of two plates to be joined together in end to end relationship in a common plane, as shown in Figs. 1 to 5, the straps 10 preferably will be provided near the adjacent ends of said plates, parallel to said ends, and a flat key element B will be employed for cooperation with said straps. Alternatively, if the members A, A, whether of flat plate or other form, are to be joined together other than in end to end relationship in a common plane, the straps 10 may be provided on the respective members adjacent to the points where the same are to be joined together and in any desired positions relative to said members. In other words, it is pointed out in this connection that the straps 10 may have various different positions relative to the member A, A and that the key elements B may be bent in various different ways for cooperation with said straps to join said members A, A together in various different positions relative to each other, but that essentially said straps must be arranged, and said key element must either be flat or bent, in such a way that one end portion of said key element may be inserted in the slot formed by the strap of one of the members A, and the other end portion thereof may be inserted in the slot formed by the strap of the other member A. In any event, to join and lock together any two members A, A, one end portion of the key element B is inserted in the slot 11 of one of the members A, the other end portion of said key element is inserted in the slot 11 of the other member A and end portions of the key element then are bent into engagement with the outer or remote side edge portions of the straps 10. Thus, the members A, A are locked together against separation. Moreover, since the key element is of a cross sectional size to closely fit the slots 11, the members A, A are held effectively against any other movements relative to each other.

If the members A, A are of considerable width, duplicate joints of the character described may be employed to connect said members at spaced apart points, as illustrated for example in Fig. 5 of the drawing. Moreover, two or more spaced apart straps may be employed in lieu of any single strap, as will be apparent from the illustration of dual straps 10 in Fig. 7 of the drawing.

If the straps 10 are pressed from the members A, A, openings thereby will be formed in said members in underlying relationship to said straps, and under such conditions it will be necessary, in order to hold said members against movement relative to each other, that the end portions of the key element B span said openings and at each side thereof engage flatly against the members A. Accordingly, in order to provide for such spanning of said openings and, at the same time, to provide tongues at the ends of the key element to be bent against the outer or remote side edges of the straps 10 to lock the members A, A together, each end of the key element B is longitudinally slit at one or more places to provide one or more tongues 12 to be bent against a related strap and one or more fingers 13 to span the opening underlying the tongue and to engage the member A beyond said opening. As illustrated the present instance and by way of example, each end of the key element B is slit at two laterally spaced points, thereby providing a pair of fingers 13, one at each side of said key element, and a locking tongue 12 between each pair of said fingers.

As will be apparent from the foregoing, the members to be joined together may readily be fabricated in the shop; the key elements may be produced cheaply and easily as stampings; assembly of the key elements with the members A, A to connect the same requires little or no skill and may be practiced rapidly, and the connections when made will serve to securely hold the members against separation or movement relative to each other. Moreover, it will further be apparent that in lieu of providing a key element separate from both of the members to be connected, said key element may be formed in some instances as a tongue integral with one of said members for connection with the other of said members in the manner shown and described to connect said members together.

Without further description, it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A structural joint comprising a pair of members to be joined together, a strap on each member joined thereto at its ends and offset therefrom between its ends to provide a slot, a key connecting said members, said key having opposite end portions thereof extending through said slots, and a tongue on each end of said key bent into engagement with its related strap to lock said members together, a part of each end portion of said key extending beyond the related strap and tongue in the form of a finger disposed in supporting engagement with the related member.

2. A structural joint comprising a pair of members to be joined together, a strap on each member joined thereto at its ends and offset therefrom between its ends to provide a slot, a key connecting said members, said key being of a width and thickness corresponding substantially to the width and depth, respectively, of the slots formed by said straps and having opposite end portions thereof extending through said slots, and a tongue on each end of said key bent into engagement with its related strap to lock said members together, a part of each end portion of said key extending beyond the related strap and tongue in the form of a finger disposed in supporting engagement with the related member.

3. A structural joint comprising a pair of members to be joined together, a strap on at least one of said members joined thereto at its ends and offset therefrom between its ends to provide a slot, a key joined to the other of said members and having a free end portion extending through said slot, and a tongue on said key bent into engagement with said strap to lock said members together, a part of the free end portion of said key extending beyond said strap and tongue in the form of a finger disposed in supporting engagement with said first mentioned member.

4. A structural joint comprising a pair of members to be joined together, at least one of said members being of sheet metal and having struck therefrom a strap which is joined at its ends to said member and offset between its ends from said member to provide a slot, a key joined to the other of said members and having a free end portion extending through said slot, and a tongue on said key bent into engagement with said strap to lock said members together, a part of the free end portion of said key extending beyond said strap and tongue in the form of a finger disposed in supporting engagement with said first mentioned member.

5. A structural joint comprising a pair of members to be joined together, a strap on at least one of said members joined thereto at its ends and offset therefrom between its ends to provide a slot, a key joined at one end to the other of said members and having its other end portion extending through said slot, the said other end of said key being slit to provide a finger and a tongue, said tongue being bent into engagement with said strap to lock said members together and said finger extending beyond said strap and tongue and being disposed in supporting engagement with said first mentioned member.

6. A structural joint comprising a pair of members to be joined together, a strap on at least one of said members joined thereto at its ends and offset therefrom between its ends to provide a slot, a key joined at one end to the other of said members and having its other end portion extending through said slot, the said other end of said key being slit to provide a pair of fingers and a tongue therebetween, said tongue being bent into engagement with said strap to lock said members together and said fingers extending beyond said strap and tongue and being disposed in supporting engagement with said first mentioned member.

7. A structural joint comprising a pair of sheet metal members to be joined together, each of said members having struck therefrom a strap which is joined thereto at its ends and offset therefrom between its ends to provide a slot, a sheet metal key of a width and thickness corresponding substantially to the width and depth, respectively, of said slots, said key having opposite end portions thereof extending through said slots respectively, each end portion of said key being longitudinally slit to provide a pair of fingers and a tongue therebetween, said tongues being bent into engagement with said straps, respectively, to lock said members together and said fingers extending beyond said straps and tongues, respectively, and being disposed in supporting engagement with said members, respectively.

8. A structural joint as set forth in claim 3 in which the connected members are disposed in different planes and with one of the members abutting the other member.

9. A structural joint as set forth in claim 3 in which the connected members are disposed in a common plane in edge to edge abutting relationship to each other.

10. A structural joint as set forth in claim 7 in which the connected members are disposed in different planes and with one of the members abutting the other member.

11. A structural joint as set forth in claim 7 in which the connected members are disposed in a common plane in edge to edge abutting relationship to each other.

RAY C. SKEEL.